United States Patent [19]

Schatz

[11] Patent Number: 4,633,671
[45] Date of Patent: Jan. 6, 1987

[54] EXHAUST GAS DRIVEN SUPERCHARGER FOR SUPERCHARGING INTERNAL COMBUSTION ENGINES

[76] Inventor: Oskar Schatz, Tellhohe 14, D-8031 Stockdorf, Fed. Rep. of Germany

[21] Appl. No.: 609,929

[22] Filed: May 14, 1984

[30] Foreign Application Priority Data

May 18, 1983 [DE] Fed. Rep. of Germany ....... 3318136

[51] Int. Cl.$^4$ ............................................. F02B 37/00
[52] U.S. Cl. .................................................... 60/605
[58] Field of Search ................ 60/597, 598, 602, 605, 60/613; 417/380

[56] References Cited

U.S. PATENT DOCUMENTS

| 1,350,570 | 8/1920 | Sarjent ................................. 60/613 |
| 4,211,082 | 7/1980 | Bristol ................................. 60/605 |

FOREIGN PATENT DOCUMENTS

| 781987 | 3/1935 | France .................................. 60/605 |
| 2285514 | 4/1976 | France .................................. 60/602 |
| 638923 | 6/1950 | United Kingdom .................. 60/605 |
| 815494 | 6/1959 | United Kingdom .................. 60/605 |

*Primary Examiner*—Michael Koczo
*Attorney, Agent, or Firm*—Harness, Dickey & Pierce

[57] ABSTRACT

An exhaust gas driven supercharger for an internal combustion engine having cylinders which produce cyclical exhaust gas pulses. The supercharger consists of a housing which is divided by a movable partition into a supercharging chamber which is connected to the engine air intake, and an exhaust chamber which is connected to the engine exhaust. The exhaust gas path contains a variable restriction choke valve for modifying the duration of the exhaust gas pulses in the exhaust chamber.

2 Claims, 3 Drawing Figures

EXHAUST GAS DRIVEN SUPERCHARGER FOR SUPERCHARGING INTERNAL COMBUSTION ENGINES

BACKGROUND AND SUMMARY OF THE INVENTION

This invention relates to an exhaust gas driven supercharger for supercharging internal combustion engines. The supercharger has a supercharging chamber, that is subdivided by a moving partition into an exhaust gas chamber having an exhaust gas inlet and an exhaust gas outlet, and a supercharging air chamber with a supercharging air inlet and a supercharging air outlet.

Positive displacement superchargers driven by exhaust gas are known as a theoretical possibility. However, the utilization of the exhaust gas energy periodically leaving one of the cylinders of the internal combustion engine has shortcomings in many cases. For example, it is frequently the case that the exhaust gas pulse from the internal combustion engine available at the supercharger is too short in duration to outbalance the inertia of the partition such as a piston in order to produce an efficient supercharging stroke.

In the case of four cylinder engines, the exhaust gas pulses mutually hinder each other since there is little time duration between pulses so that, with an increase in the number of cylinders, there is less and less available energy gradient for driving the partition of a positive displacement supercharger by means of the natural exhaust gas pulses. A similar effect occurs at high engine speeds.

The object of this invention is to optimize the exhaust gas pulses used for driving a positive displacement supercharger in a way which is independent of the number of cylinders of the engine and its operating speed. In accordance with the invention, its operating means are placed in the exhaust path of an internal combustion engine for modifying the pulse duration and/or the pulse frequency supplied to an exhaust gas driven supercharger.

In keeping with a useful form of the invention, the exhaust gas outlet of the internal combustion engine is fitted with a choke means which, as part of a further useful form of the invention, may be controlled with respect to pressure and/or duration of the choking action.

In another possible form of the invention, the exhaust gas inlet or the exhaust gas outlet of the supercharger may be fitted with a valve controlled by a pulse generator.

A particularly useful form of the invention is one in which the exhaust gas inlet of the exhaust gas chamber is placed downstream from an exhaust gas collector and the exhaust gas side of the supercharger is fitted with a pulse generator, the exhaust gas side of the supercharger being preferably fitted with an inlet and/or an outlet valve.

Preferably the controller for the exhaust gas side of the supercharger may be fitted with an electronic automatic controller processing the operating data of the engine and/or of the supercharger and/or of the vehicle.

If it is desired to make these above measures even more effective, for example in the case of engines with a very large number of cylinders, then as part of a further useful teaching of the invention, the supercharger may have a further exhaust gas chamber having an additional moving partition, the two partitions being ganged together for joint motion and being able to be acted upon by exhaust gas in the two exhaust gas chambers in opposite directions. The outcome is that the number of the engine cylinders acting on one exhaust gas chamber may be reduced to half as many. In conjunction with the measures for increasing the pulse duration or for changing the pulse frequency, it is then possible to cope even when unfavorable working conditions for exhaust-powered positive displacement superchargers. A similar method effect is produced if a number of exhaust gas superchargers are used that each has one exhaust gas chamber and a supercharging air chamber.

A more detailed account of the invention will now follow based upon the working examples of the invention to be seen in the drawings.

DETAILED DESCRIPTION OF THE INVENTION

Figure 1:
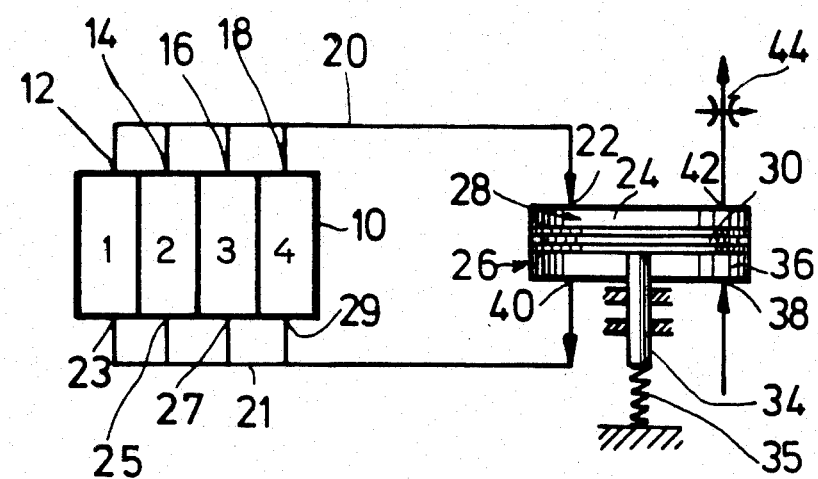
FIG. 1 shows a four cylinder internal combustion engine with an exhaust gas driven positive displacement supercharger and an adjustable choke at the exhaust gas outlet of the supercharger.

With particular reference to FIG. 1, a four cylinder in-line engine generally designated by reference number 10 has cylinders 1, 2, 3 and 4 and an outlet valve 12, 14, 16 and 18 at each cylinder. These valves 12 to 18 open into a common exhaust gas duct 20, that opens by way of an exhaust inlet 22 into the exhaust gas chamber 24 of a positive displacement supercharger 26. In the supercharging chamber 28 of the positive displacement supercharger 26 there is a partition 30 in the form of a flat piston that is able to move and is guided from outside the supercharging chamber 28 by way of a guide rod 34 so that the sealing and guiding functions are separate from each other, thus minimizing losses due to friction in the supercharger and facilitating upkeep and lubrication.

The guide rod 34 is acted upon by a spring 35, that pushes the partition toward the top position and may be so designed that the stroke of piston 32 and air flow pumped by piston 32 are automatically adapted to the engine load which is proportional to the intensity of the exhaust gas pulses.

On the side of the partition 30 facing away from the exhaust gas chamber 24 there is a supercharging air chamber 36 with a supercharging air inlet 38 and a supercharging air outlet 40, both of which have check valves.

The exhaust pulses from engine 10 moving into the exhaust chamber 24 pressurizes an exhaust gas chamber 24 and drives the partition 30 toward the supercharging air chamber 36 in order to displace the supercharging air out of the supercharging air chamber 36. A choke 44 is connected downstream from the exhaust gas outlet 42 of the exhaust gas chamber 24 which is preferably adjustable with respect to pressure and/or duration of the choking action. This action of the choke 44 is adapted to extend the duration of exhaust gas pressure pulses that would otherwise not be long enough to overcome the inertia of the partition 30, or to amplify the force produced by a pulse of insufficient magnitude acting on the partition 30, so that supercharging air is displaced from the supercharger air chamber 36 and is supplied by way of the duct 21 to the inlet valves 23, 25, 27 and 29 of the engine 10.

Figure 2:
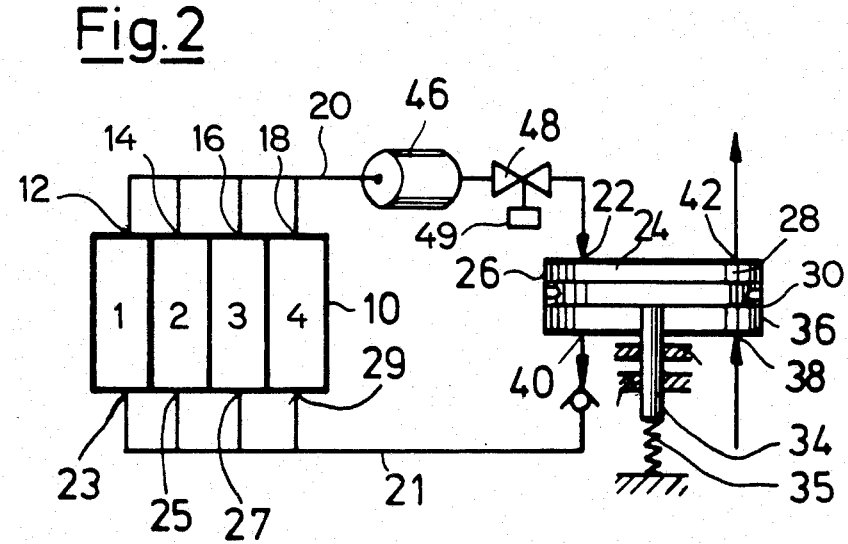
FIG. 2 shows a four cylinder internal combustion engine with an exhaust gas driven positive displacement supercharger and a pulse generator for the exhaust gas pulse.

FIG. 2 shows a similar arrangement to that of FIG. 1 wherein like parts are marked with like reference numbers. However, the choke 44 on the exhaust gas outlet 42 of the exhaust gas chamber 24 shown in FIG. 1 is omitted. In place of choke 44 there is provided an exhaust gas collector 46 and a valve 48 operated by a pulse generator 49 between the engine 10 and the positive displacement supercharger 26 in the exhaust gas duct 20. Supercharging air is displaced by the partition 30 out of the supercharging air chamber 36 and makes it way via the duct 21 into the cylinder of the engine, whose inlet valve 23, 25, 27 or 29 are periodically opened. The pulse generation 49 or control is so operated that the pressure pulse coming from the supercharger 26 arrives at the engine cylinder in question during the opening time of the association inlet valve at the desired point in time. The supercharging air outlet 40 of the supercharging air chamber 36 may in this respect be designed without a check valve member.

Figure 3:
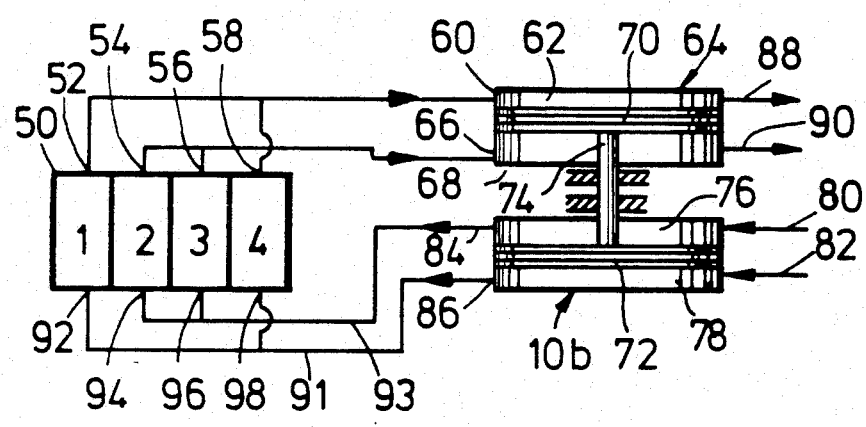
FIG. 3 shows a four cylinder internal combustion engine with an exhaust gas driven positive displacement supercharger, that has a second exhaust gas chamber with a second partition.

The form of the invention to be seen in FIG. 3 effects the aim of the invention i.e. optimizing the exhaust gas pulse in a different manner. It assumes that in keeping with the prior art, four stroke in-line engines with four cylinders are so designed for reasons of balancing inertia and to achieve equal ignition intervals between the separate cylinders that the pistons of the two outer cylinders 1 and 4 were joined to the crankshaft of the engine with equal crank angles, whereas the two inner cylinders 2 and 3 are offset by 180 degrees from cylinders 1 and 4. For this reason, the outer pistons 1 and 4 move with each other in the same direction always, whereas the inner pistons 2 and 3 move with each other exactly oppositely that of the outer pistons. If, for example, the two outer pistons 1 and 4 are just moving through their bottom dead center (BDC), then at the same time the inner pistons 2 and 3 will go through their top dead center (TDC). At this point in time, in the case of four stroke engines, the inlet valves 52 or 58 of the one outer cylinder 1 or 4 will still be open because of so-called valve overlap, whereas the outlet valve of the other outer cylinder will have just opened.

In the four in-line four stroke engine 50 shown in FIG. 3, the outlet valves 52 and 58 of the two outer cylinders 1 and 4 are connected with the exhaust gas inlet 60 of a first exhaust gas chamber 62 of a positive displacement supercharger 64 and the outlet valves 54 and 56 of the two inner cylinders 2 and 3 are connected with the exhaust gas inlet 66 of a second exhaust gas chamber 68. The two exhaust gas chambers 62 and 68 are located on the two sides of a first moving partition 70, that is rigidly joined with a second moving partition 72 by way of a guide rod 74 for ganged or joint motion. On the two sides of the second partition 72 there are two supercharging air chambers 76 and 78 with supercharging air inlets 80 and 82 respectively and the supercharging air outlets 84 and 86, that are optionally fitted with a check valve (not shown). The exhaust gas outlets of the exhaust gas chambers 62 and 68 are designated by reference numbers 88 and 90, respectively.

When the exhaust gas chamber 62 is receiving exhaust gas, the double piston formed by the partitions 70 and 72 is moved downwardly in terms of FIG. 3 and air is forced out of the supercharging air chamber 78 and conducted by way of an air duct 91 alternately through the inlet valve 92 or 98 into the outer cylinders 1 and 4, whereas when exhaust gas is conducted into the exhaust gas chamber 58, the partitions 70 and 72 will be moved in the opposite directions and will force supercharging air out of the supercharging air chamber 76 via a duct 93 alternately through the inlet valve 94 or 96 into the inner cylinder 2 or 3. The positive displacement supercharger 64 will be seen from this to function in such a way that the operation is the same as positive displacement superchargers operating with two separate twin cylinder engines that are made up of cylinders 1 and 4 on the one hand and 2 and 3 on the other.

During operation of supercharger 64 shown in FIG. 3, when a cylinder outlet valve is opened, air will be pumped to the appropriate inlet valve when it is opened without any special pulse generator being needed for this since the surge of exhaust gas from the cylinder will be properly timed.

The measures explained with reference to FIGS. 1 and 2 on the one hand and to FIG. 3 on the other hand may be used jointly as well if necessary in order to optimize the exhaust gas pulses.

The control of the choke 44 or of the pulse generator 49 is best automatic using an electronic controller which processes the operating data of the engine and/or of the supercharger and/or of the vehicle to be powered by the engine 10.

The supercharger 26 or 64 is preferably fitted with some damping means for controlling the motion of the partition 30, 70 and 72, such damping means being, for example, hydraulic.

What is claimed is:

1. An exhaust gas driven supercharger for an internal combustion engine having cylinders which produce cyclical exhaust gas pulses comprising;

a housing defining a supercharging chamber, a movable partition separating said chamber into two chambers, an exhaust gas chamber having an exhaust inlet and an exhaust outlet, and a supercharging air chamber having an air inlet and air outlet, a first exhaust duct for conducting exhaust gas from said cylinder to said exhaust gas chamber through said exhaust inlet, such that said exhaust gas acts upon said partition to urge said partition to move in said housing, a second exhaust duct for conducting exhaust gas from said exhaust gas chamber through said exhaust outlet, a first air duct for conducting air into said supercharging air chamber through said air inlet, a second air duct for conducting air to said cylinder from said supercharging air chamber through said air outlet such that movement of said partition causes air to be pumped through said second air duct into said cylinders, and means incorporated into either of said first or second exhaust ducts for modifying the duration of pulses of exhaust gas within said exhaust gas chamber.

2. The exhaust gas supercharger according to claim 1 wherein said means for modifying the duration of exhaust gas comprises a variable restriction choke valve in said second exhaust duct.

* * * * *